May 15, 1962   A. DEMOISY   3,034,423
CONTINUOUS ROTARY PRESS
Filed Jan. 18, 1957   3 Sheets-Sheet 1

INVENTOR
ALBERT DEMOISY
By Linton and Linton
ATTORNEYS

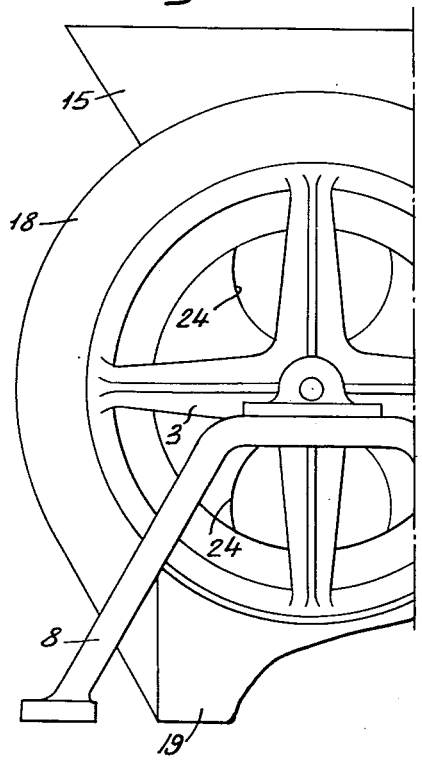
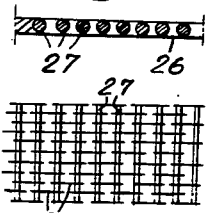
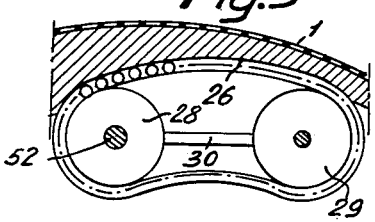
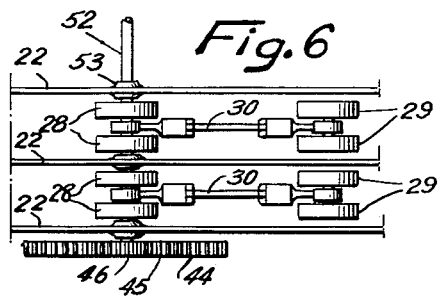
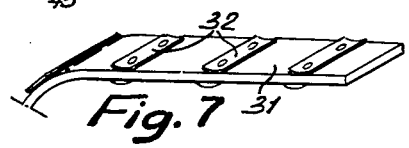
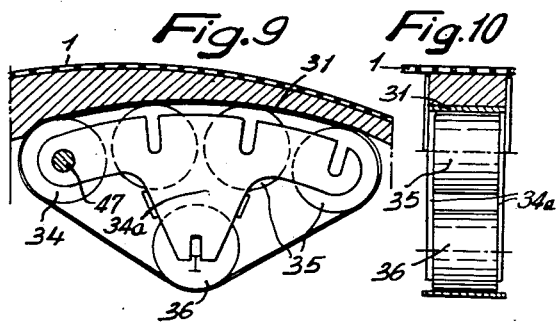
INVENTOR
ALBERT DEMOISY
By Linton and Linton
ATTORNEYS

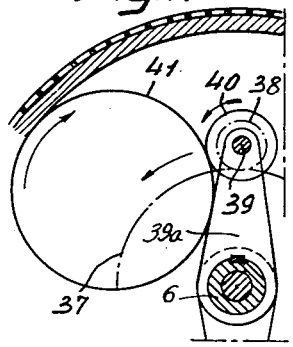
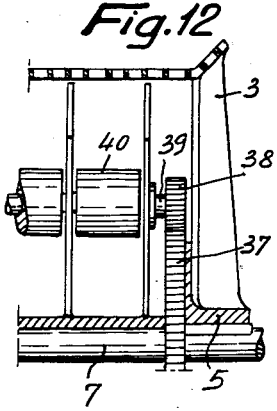
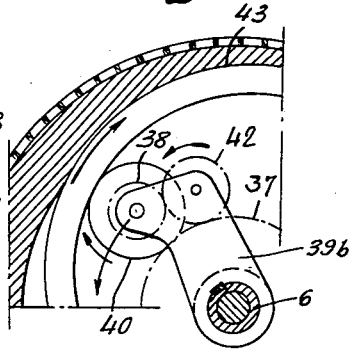
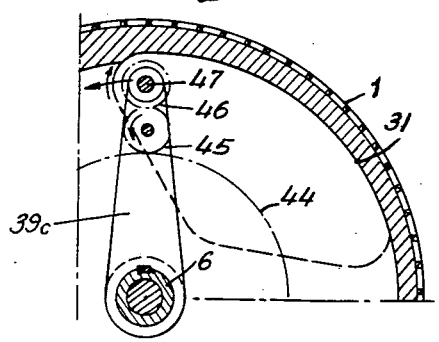
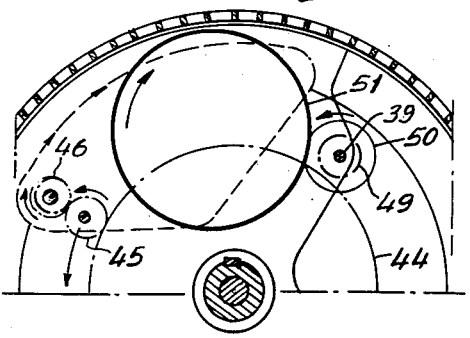
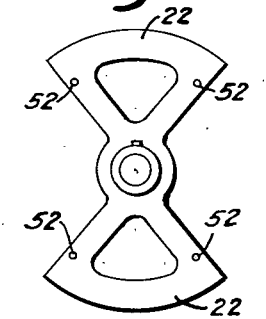
INVENTOR
ALBERT DEMOISY

United States Patent Office 3,034,423
Patented May 15, 1962

3,034,423
CONTINUOUS ROTARY PRESS
Albert Demoisy, Faubourg Saint-Jean et Rue Celer,
Beaune, France
Filed Jan. 18, 1957, Ser. No. 634,869
6 Claims. (Cl. 100—117)

The present invention relates to expressing rotary presses of the continuous-operation type, for example of the type utilized for extracting a liquid by centrifugating a spongy or cellular mass.

Heretofore, in continuous rotary presses, the substance to be treated in the form of a relatively thin layer in a rotary turbine having perforated walls is first drained by centrifugation and then subjected to the successive pressures of cylinders of progressively increasing weight which are disposed in cells formed in an inner rotor. In order to avoid any laceration of the substance to be treated the latter is not displaced within the turbine during the time period in which it is subjected to the pressure of each cylinder of the set, and this substance is transferred to the next cell only when it has resumed its free, uncompressed state. The detrimental rasping effect on the perforated wall is reduced to a minimum, and the skew movement imparted to the material facilitates a kind of "digging" thereof which forms again its discharge channels. Thus, the material is delivered to the next cylinders under the best possisble conditions. The resulting desiccation is very satisfactory.

However, in the treatment of certain fragile products (for example fruits) it is observed that the juices are sometimes overladen with pulp material. Now it is the specific object of the rotary press of this present invention to avoid this inconvenience.

In the present invention, the first pressure stage or stages, wherein the material to be treated is still loaded with juice, has the cylinders, whose too violent action may prove detrimental to the quality and separation of the product after treatment, replaced by positively driven endless tracks. Thus, these tracks will reduce the pressure per surface unit and increase the bearing surface to a substantial degree as well as the time during which the pressure is effective. Moreover, the pressure application proper is more gradual.

When it is desired to obtain a complete desiccation, it is possible in the last stage or stages of the rotary press, where the material has a minor moisture content, to substitute cylinders for the aforesaid endless tracks, these cylinders being also positively driven to avoid any mixing or kneading action.

In order to afford a better understand of the present invention and of the manner in which the same may be carried out in practice, reference will now be made to the accompanying drawings forming part of this specification and illustrating diagrammatically by way of example several typical embodiments of the present invention. In the drawings:

FIGURE 2 is a fragmentary end view of the machine, as seen from the discharge end from which the residue expressed pulp and skins are discharged.

FIGURES 3 and 4 are a transverse sectional view and a plan view respectively of one portion of an endless track having a relatively heavy bearing surface;

FIGURE 5 is a fragmentary view showing the arrangement of the track inside the turbine;

FIGURE 6 is a plan view of the arrangement for supporting the track;

FIGURES 7 and 8 are a perspective view and a cross-sectional view, respectively, showing fragments of a form of track having a relatively light bearing surface;

FIGURES 9 and 10 show in cross-sectional view and radial section, respectively, of a modified form of track arrangement;

FIGURES 11 and 12 are a cross-section and a radial section, respectively, showing the cylinder driving arrangement;

FIGURE 13 is a cross-section showing a constructional modification of cylinder drive;

FIGURE 14 is a cross-section showing the track driving roller shaft arrangement; and FIGURE 15 is a cross-section showing an arrangement for driving the cylinders and tracks from a central toothed wheel.

FIGURE 16 is an end view of a drum partition; and

Figure 1:
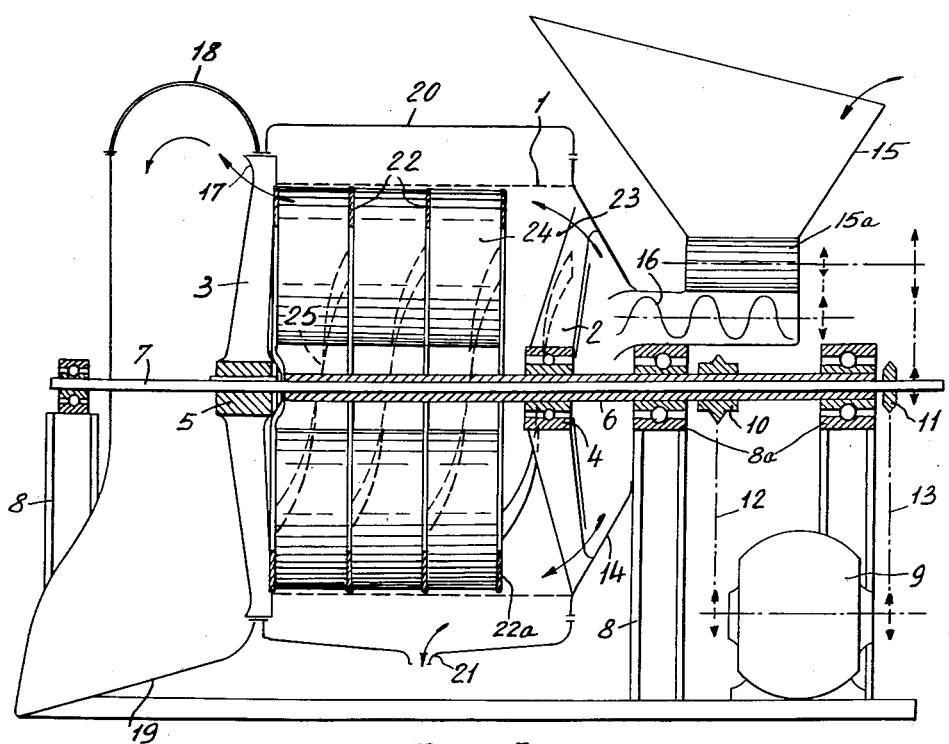
FIGURE 1 is an axial longitudinal section of a machine constructed in accordance with the teachings of the present inventions.

In the embodiment illustrated in FIGURES 1 and 2 of the drawings the centrifugal turbine consists of a cylindrical peripherally perforated housing or drum 1 supported at its respective ends by arms 2, 3 fixedly attached to hubs 4, 5 respectively. The hub 4 is rotatably mounted through a suitable bearing on the horizontal hollow shaft 6 inside which extends freely the inner shaft 7 fixedly attached to the hub 5. The shafts 6, 7 are supported through other bearings 8a by the machine frame structure 8 and are respectively driven at different speeds from a motor 9, for example through a transmission comprising sprockets 10, 11 and chains 12, 13.

On the input side of the housing 1 a bell-mouthed inlet 14 is mounted to be fed with raw material to be treated from a screw conveyor 16 disposed between this inlet and a crushing device 15a fed through a hopper 15. On the output side of the housing 1 a bell-mounted outlet 17 discharges the residue expressed pulp and skins into a stationary deflecting hood 18 from which they are directed into a chute 19.

The perforated turbine wall is surrounded by a fixed closed casing 20 for collecting the juice extracted from the substance treated in the apparatus, thus juice flowing out through an outlet 21 provided at the bottom of the casing.

The inner rotor 22a inside of drum 1 fixedly carried by and driven from the hollow shaft 6 is divided into a plurality of compartments by inner sheet metal partitions 22 disposed at right angles to the axis. The compartments of rotor 22a located following the first compartment 23 in the direction of flow as indicated by the arrows in FIGURE 1 are provided with pressing members illustrated diagrammatically in FIGURES 1 and 2 in the form of cylinders or roller 24, of which two are disposed at diametrally opposite locations in each compartment. Between said pressing members, each partition 22 is connected to the next one by helical guiding walls 25 merging into the radially-directed edges of the compartment-forming sheet metal partitions 22.

Figure 17:
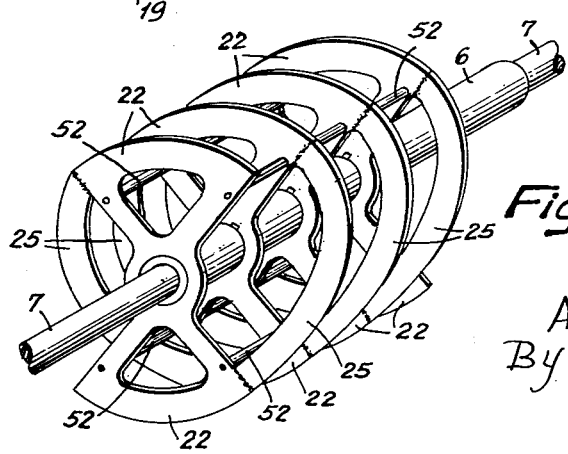
FIGURE 17 is a perspective view of the assembled inside drum or rotor.

The compartment-forming sheet metal partition 22 is shown in end view in FIGURE 16. The various partitions 22 are rigidly connected, as seen in the perspective view of FIGURE 17, to the hollow shaft in spaced relationship to each other and in such spaced position maintained by means of shafts 52 parallel to one another and to the shaft 6. Each two successive partitions 22 are connected together by a helical guiding wall portion 25. Thus, with reference to FIGURE 17, each guiding wall 25 of the set of guiding walls situated to the left of the rotor is welded at its upper end to the upper radial edge of the successive partition 22. Each wall 25 of the set placed to the right of the rotor is welded at its lower end to the right lower radial edge of one partition 22 and at its upper end to the right upper radial edge of the successive partitions 22. Thus, a channel of substantially helical shape is formed by the adjacent surfaces of the cylindrical perforated housing 1, of the inner sheet metal partitions 22 and of the helical guiding rolls 25.

In place of members 24, endless tracks 26 may be used for the first stages or compartments of rotor 22a according to this present invention and may be of the heavy bearing-surface type, for example a strong stainless steel woven fabric 26c (FIGURE 3) hinged in the longitudinal direction on transverse rods 27 but rigid in the transverse direction.

This track is passed over a driven roller 28 (FIG. 5) and over an idle roller 29, but the woven fabric constituting it is not actually stretched between these rollers, since it is the centrifugal force that presses it against the material under treatment. The shaft 52 carrying the roller 28 is fixed to said rotor, and the other roller 29 is supported by the end of an arm 30 (FIGURE 6) pivoting freely about the axis of roller 28, so that the track unit may pivot about the axis of the driven roller.

In another form, the tracks may also be of the light bearing-surface type, i.e. consist of an endless inert belt 31 stiffened in the transverse direction by stainless metal rods 32 which may also consist of plastic material or wood (FIGURE 7) unless it is preferred to weave the fabric 31 with rigid or semi-rigid weft wires or rods 33 (FIGURE 8).

In this case, the endless belt 31 is passed over a driven roller 34 (FIGURE 9) rotatably mounted on shaft 52 and over idle rollers 35, and tensioned by an adjustable roller 36. A pair of plates 34a rotatably support rollers 34, 35, and 36 therebetween while rollers 35 and 36 are also slidably mounted thereon. Belt 31 engages the material to be treated through the movement of rollers 35 of adequate weight which are urged in the outward direction by the centrifugal force applied thereto. The track unit is also adapted to pivot about the shaft 52 of said driven roller.

The means by which the rotation of the tracks or cylinders may be obtained will now be described.

At the output end of the turbine the arms 3 carry a toothed wheel 37 (FIGURE 11) in constant meshing engagement with a pair of pinions 38 keyed respectively on two shafts 39 fixed to the rotor 22a by arm 39a keyed on shaft 6 and disposed symmetrically relative to the main axis of the machine extending throughout the length of the machine. These shafts carry rollers 40 adapted to drive the presser rollers 41 by frictionally engaging same.

In a modified form of cylinder drive between pinions 38 and toothed wheel 37 the idle pinions 42 (FIGURE 13) may be disposed when it is required to reverse the direction of rotation, for example for driving, from the inside, a large-diameter cylinder 43 (FIGURE 13) disposed around the shafts. Pinions 38 and 42 are rotatably supported by arm 39b keyed to shaft 6. Preferably, the gear ratio will be so selected as to keep the peripheral velocities of the pressing members close to the differential velocity of the inside of the turbine.

The track-driving roller shafts are actuated in a similar manner. FIGURE 14 illustrates a toothed annulus 44 keyed to shaft 7 thus being rigid with the turbine and meshing with a pinion 45 engaging in turn another pinion 46 rigid with the driving shaft 47 of the track 31, the shafts of pinions 45, 46 being supported by arm 39c keyed to shaft 6 and therefore stationary with respect to the rotor.

In a modified form of apparatus toothed wheel 44 may be used for actuating both the endless tracks and the presser cylinders, as illustrated in FIGURE 15 of the drawings. In this embodiment the pinions 45, 46 are complemented by a pinion 49 meshing with the toothed annulus 44 and rigid with the shaft 39 carrying the rollers 50 driving the cylinders 51.

It will be obvious to those skilled in the art that my invention is susceptible of modifications to adapt the same to particular applications, and all such modification which are within the scope of the appended claims are considered to be comprehended within the spirit of my invention.

I claim:
1. A continuous rotary expressing press comprising a centrifugal turbine including a perforated housing, a rotatably driven rotor positioned within said housing rotating in the same direction as said turbine but at a different speed, inner partitions provided in said rotor and extending at right angles to the axis of said rotor and dividing said rotor into a plurality of compartments disposed along said rotor axis, carrier rollers, driven rollers having affixed axis relative to said rotor axis, endless tracks constituting presser members positioned at least in the first of said compartments, each endless track being mounted on a driven roller and at least one carrying roller and capable of pivoting under the influence of centrifugal force about the axis of said driven roller during the operation of the press for pressing the material which is retained by said perforated housing of said turbine.

2. A rotary press according to claim 1, wherein each endless track consists of an endless belt which is flexible in a longitudinal direction and rigid in a transverse direction.

3. A rotary press according to claim 1, wherein presser cylinders are provided in said compartments.

4. A rotary press according to claim 1, including shafts parallel to said rotor axis fixedly connected to said driven rollers, pinions carried by said shafts, a toothed wheel fixed to said turbine and meshing with said pinions for rotating said driven rollers.

5. A rotary press according to claim 1, wherein cylinders are provided in said compartments, shafts extending parallel to said rotor axis are fixedly connected to said rotor, pinions are fixedly connected to said shafts, said driven rollers are fixedly connected to one of said shafts, a sprocket is fixedly connected to said turbine and operatively connected to said pinions for rotating the same, and means operatively connects one of said pinions to said cylinders for rotating the same.

6. A continuous rotary expressing press comprising a rotatably driven centrifugal turbine including a perforated housing, a rotatably driven rotor positioned within said housing for rotating in the same direction as said turbine but at a different speed, inner partitions provided in said inner rotor extending at right angles to the axis of said rotor and dividing said rotor into a plurality of compartments disposed along said rotor axis, presser members mounted in each of said compartments so as to exert a pressure against the material therein to be treated with said material being retained by said perforated housing of the turbine, driving means for driving said presser members, said presser members at least in the first of said compartments and consisting of endless tracks pivotally supported at one end on said driving means.

References Cited in the file of this patent
UNITED STATES PATENTS

| 1,140,683 | Johansen | May 25, 1915 |

FOREIGN PATENTS

| 1,029,069 | France | May 29, 1953 |
| 1,076,683 | France | Oct. 28, 1954 |